March 23, 1937.　　G. H. HARTMAN ET AL　　2,074,904
METHOD AND MACHINE FOR FORMING PRETZELS
Filed Aug. 7, 1933　　8 Sheets-Sheet 1
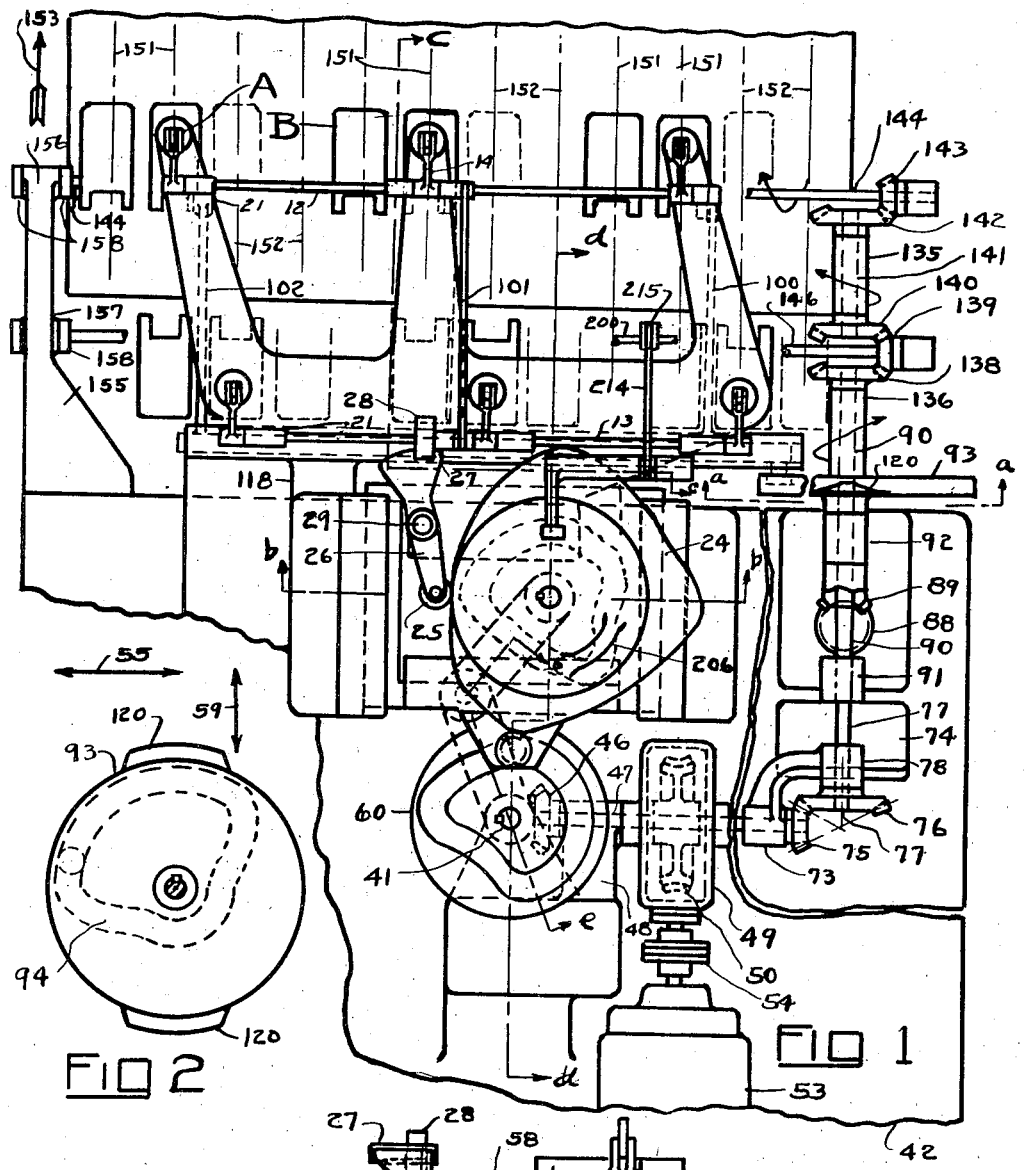
Fig 1
Fig 2
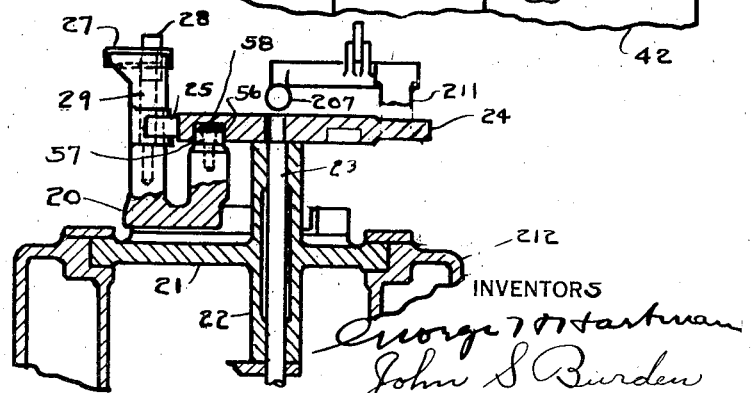
Fig 3
INVENTORS
George H. Hartman
John S. Burden

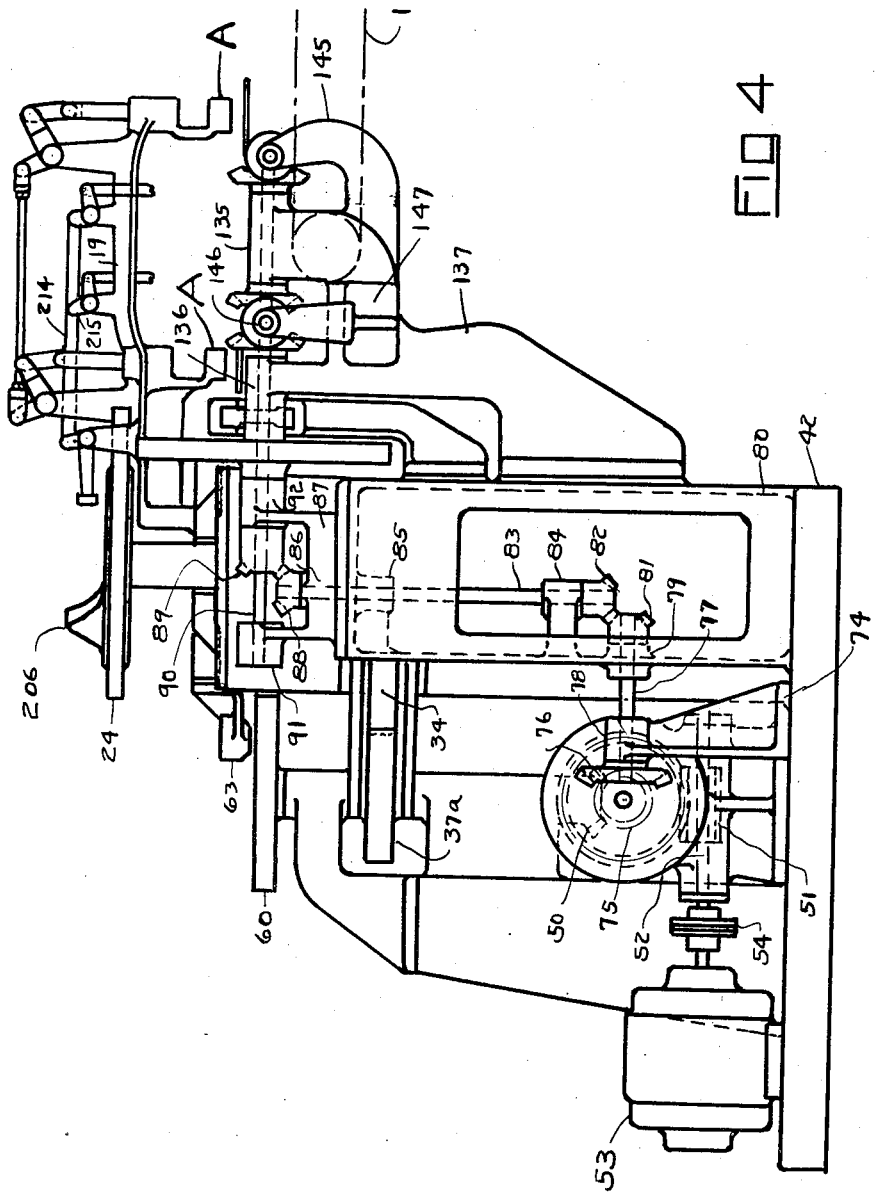

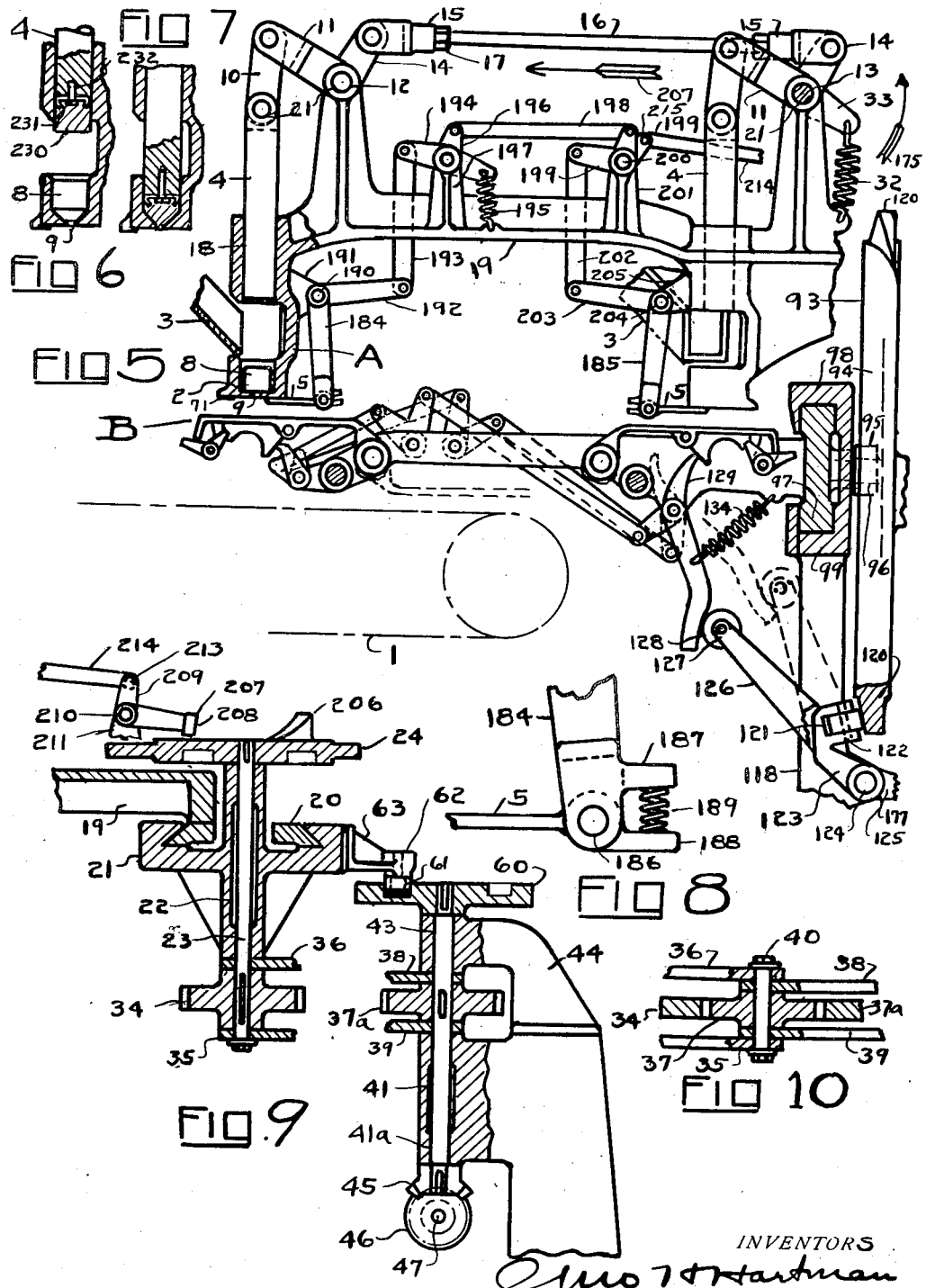

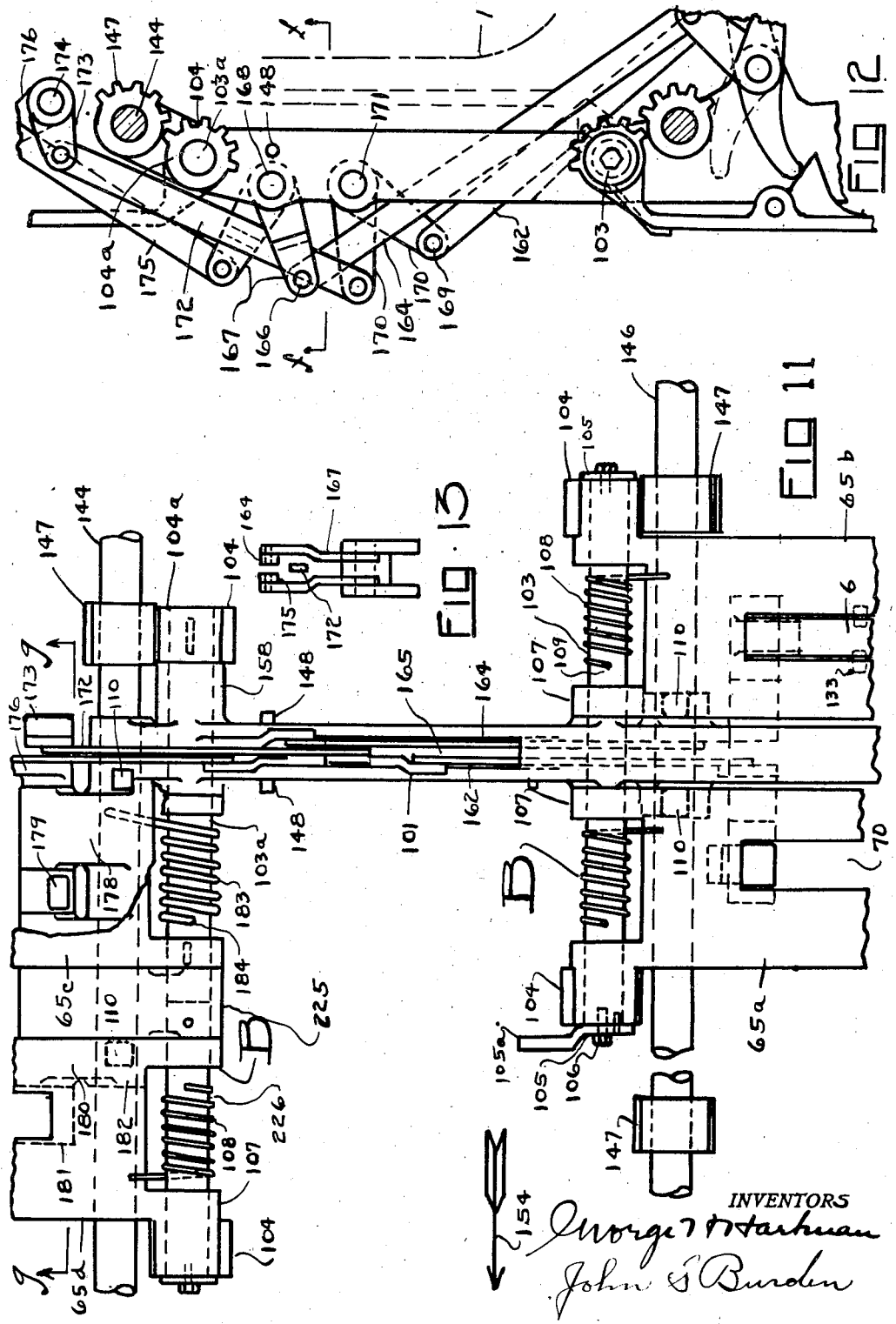

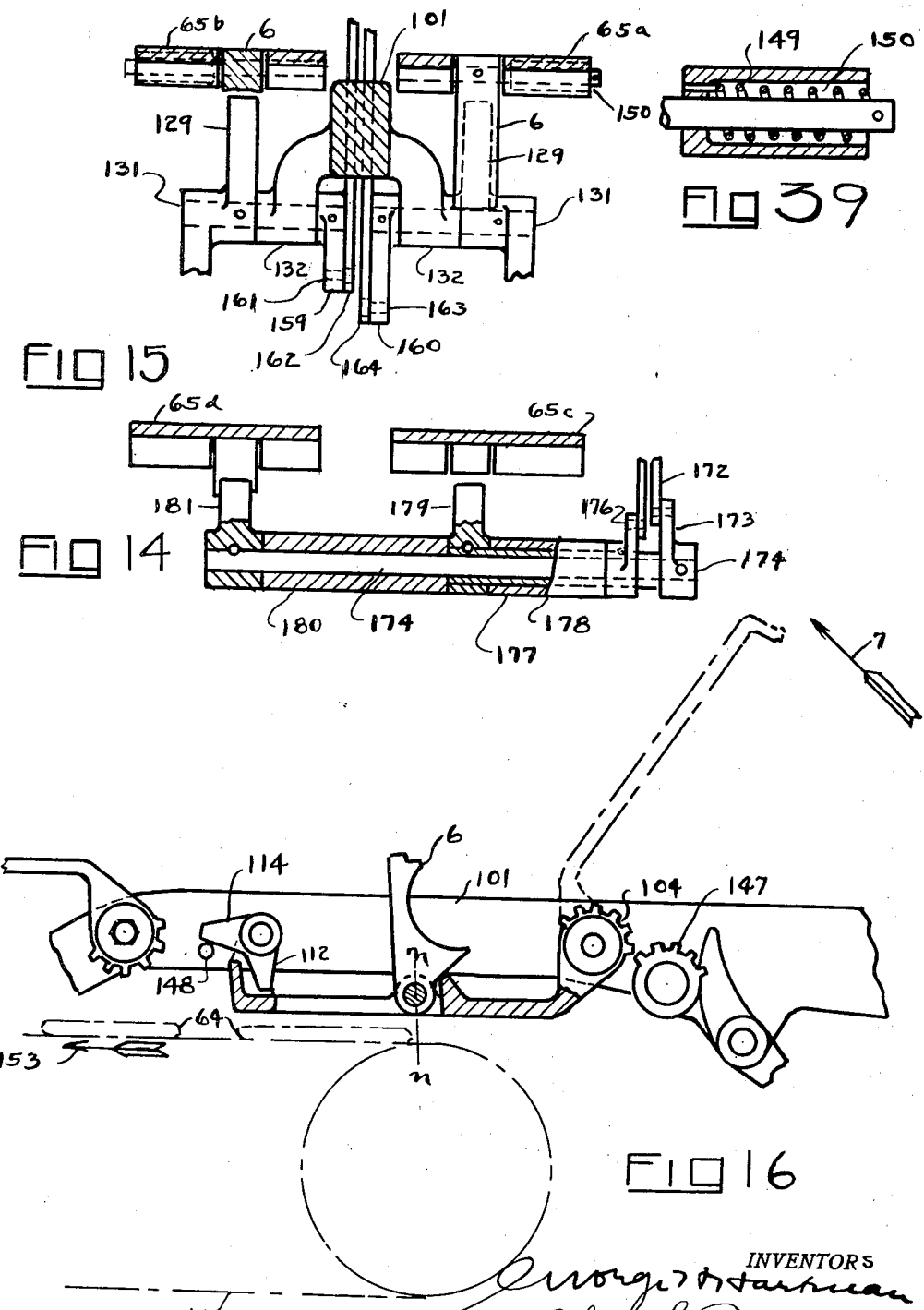

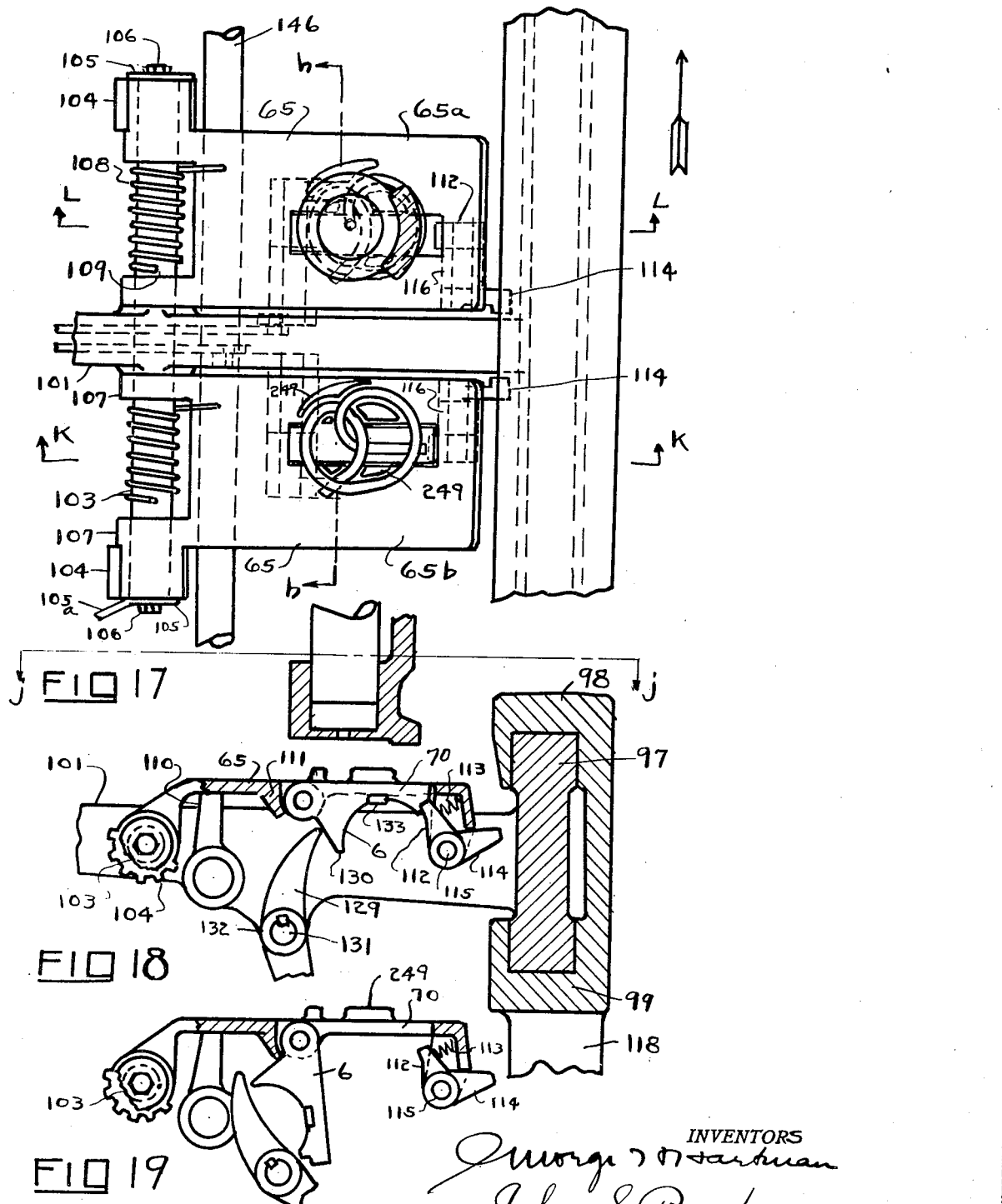

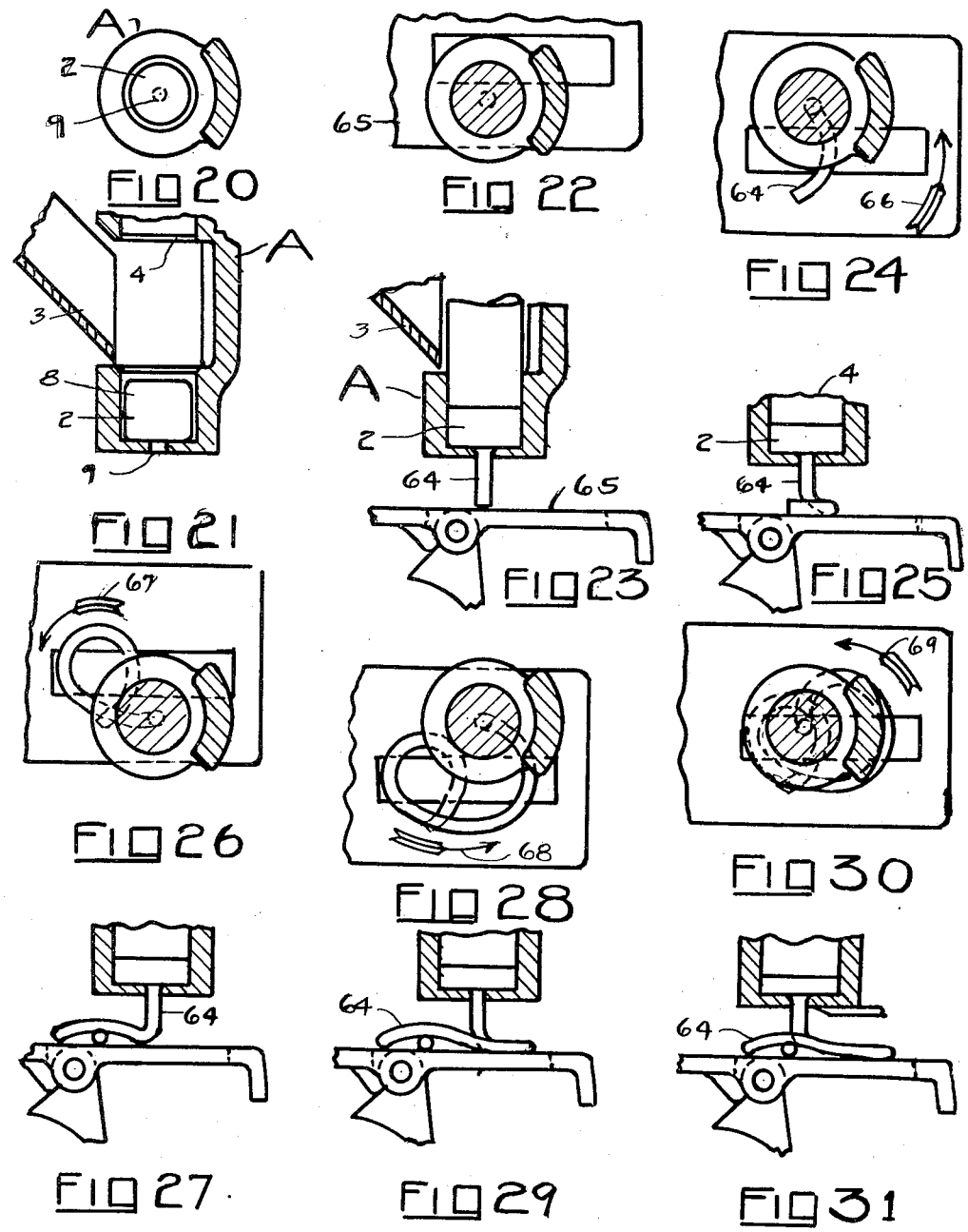

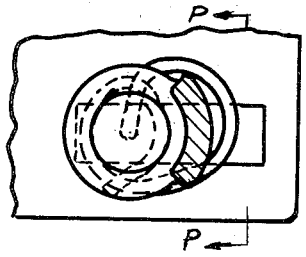
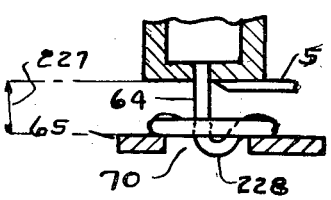
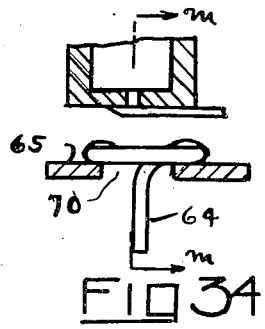
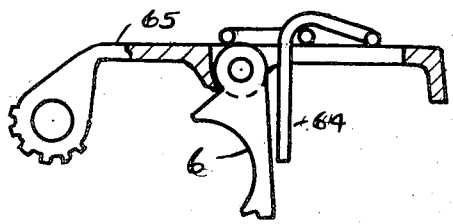
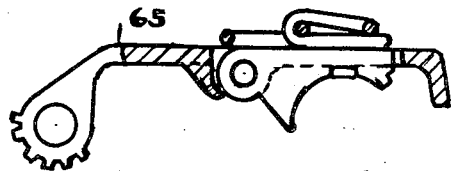
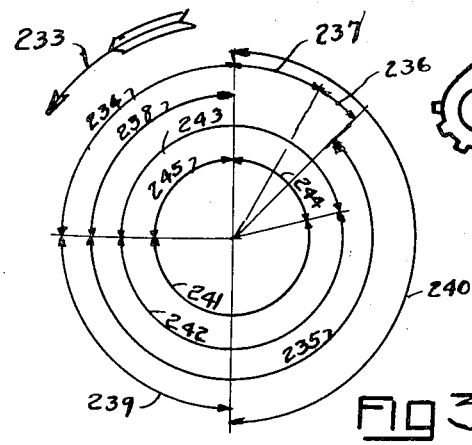
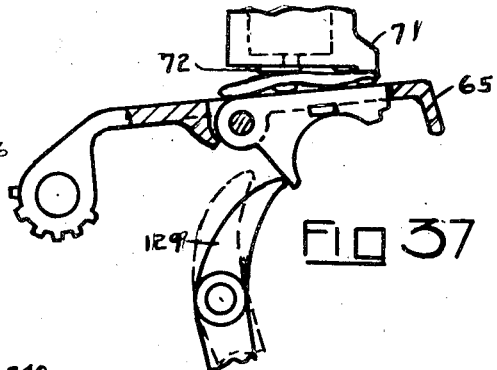
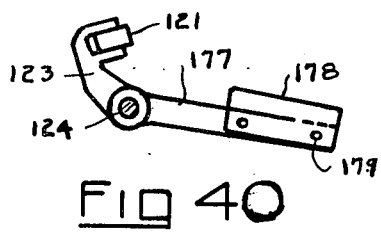

Patented Mar. 23, 1937

2,074,904

UNITED STATES PATENT OFFICE 2,074,904

METHOD AND MACHINE FOR FORMING PRETZELS

George H. Hartman and John S. Burden, Cleveland, Ohio

Application August 7, 1933, Serial No. 684,046

17 Claims. (Cl. 107—8)

This invention relates to a method and machine for forming pretzels, and in particular to such a machine as will form a completed pretzel from a slug of dough.

Pretzel making at the present time is sometimes accomplished as follows. Dough batches are mixed in the usual method employed by bakers. These batches are then placed into a screw conveyor which extrudes the dough thru an orifice. As it emerges a revolving knife cuts off slugs which drop onto a moving belt. This belt forms a part of a rolling machine and the dough slug after passing thru the rolling machine emerges as an elongated blank. This blank for one of the medium sized popular styles of pretzel being approximately $\frac{3}{16}$ dia. by about ten inches long. These blanks are now deposited by the rolling machine upon a traveling belt conveyor. Girls stand at each side of this conveyor and picking up these elongated blanks they fold and twist them by hand into the finished form of the pretzel. The pretzels are then manually deposited upon a board. As the boards become filled, they are laid to one side for proofing. After a short interval an operator takes the board, and by passing a string along the board, and under the pretzels he frees those that may have become stuck. The board prior to this string operation has been placed at the charging end of a conveyor which leads into a tank containing the solution used to brown the pretzels. By quickly jerking the board, the pretzels slide off from it to fall upon this conveyor. After passing thru the browning solution they pass beneath a shower of salt, and then onto the oven conveyor.

The dough slugs as they are chopped off by the revolving knife are controlled, as to weight, by an adjusting of a variable speed pulley drive, which controls the speed of the cut. As the speed of the knife is lessened more dough will pass into a slug, and as the speed is increased less dough, etc.

It is important that each pretzel remain uniform in weight. To accomplish and control this uniformity a test is made of the weight of the elongated blanks every few minutes. One of the objects of our invention is to make a machine that will use as much of this present equipment as it is possible to use. We plan on first making the dough slugs in the same manner as they are now made. We plan on their weight control also in the same conventional manner.

Prior designs of pretzel forming machines have considered it desirable to first form the complete elongated blank. Then they have tried to mechanically bend this completed blank and then to mechanically twist it. It has been this procedure that has caused the prior designs to fail. Dough is too fragile and too susceptible to so many varying conditions, to be handled in this manner. At present we do not know of any pretzel forming machine that is successfully forming these elongated rolled blanks into the completed pretzel.

Recognizing the impracticability of trying to form the completed pretzel from a completed elongated blank, we have adapted in our present invention a method whereby single dough slugs are singly and individually extruded into the elongated blank. As the blank is formed we move the extruder thru a path that will permit the blank to be deposited onto a receiving plate in the looped form and shape of the pretzel. This laying down of the blank in its correct looped formation simultaneously and concurrently with its formation eliminates mechanism which in prior designs is needed to handle the blank. This elimination of blank handling by mechanical means forms one of the objects of our invention.

Another object of the invention lies in elimination of the blank rolling machine, and the waste of time and floor space incident to first placing the pretzel upon boards. In our disclosure we show means to form the pretzels direct for deposit upon the charging end of that conveyor, which passes them thru the browning solution. Different bakers will require different periods of time for the proofing of the unbaked pretzel. We can accomplish this and provide any period of time needed by merely lengthening out this conveyor so that a longer time elapse between its charging and the submersion of the pretzel into the browning fluid occurs. Our method will thereby insure a uniform predetermined time of dough proofing as the travel of the conveyor will represent a fixed time condition unaffected by neglect or carelessness on the part of the operator. At the present time a great divergence in this proofing time occurs as the operator will pick up those boards closest and most convenient to himself. Many times he will catch up to the output of the girls forming the pretzels, and inversely many times the girls will have boards full of pretzels awaiting his attention. This variable our machine eliminates.

Another object of the invention is to provide a mechanism which will make pretzels of the same shape and form as they now are when hand coiled and twisted. Some present machines stamp them out like cookies, but this product is inferior and not as saleable.

Still another object includes means to create the twist in the pretzel without any twisting movement being present in the mechanism.

Another object lies in having mechanism easily changeable so that varying sizes of pretzels can be made.

Other objects, novel features of construction and improved results of the invention will be pointed out in the following description and set forth in the accompanying drawings, in which:

Fig. 1 is a plan view of the machine, portions being removed, and portions in section.

Fig. 2 is a view of one portion of the device taken in section along the line $aa$ in Fig. 1.

Fig. 3 is a section taken along the line $bb$ in Fig. 1, portions being broken away.

Fig. 4 is a side elevation of the arrangement, some portions being in section and others being removed.

Fig. 5 is an enlarged view taken along the line $cc$ in Fig. 1, portions being broken away, and others omitted.

Fig. 6 is an enlarged view of one portion of the mechanism shown in Fig. 5, but made in a different manner.

Fig. 7 is a view of the same part as shown in Fig. 6, but is a different operative position.

Fig. 8 is an enlarged view of a portion of the mechanism shown in Fig. 5.

Fig. 9 is a section taken along the line $dd$ in Fig. 1, portions being broken away.

Fig. 10 is a partial section taken along line $ee$ in Fig. 1.

Fig. 11 is an enlarged plan view of one portion of the device with portions broken away.

Fig. 12 is an end elevation of the arrangement in Fig. 11, portions being broken away.

Fig. 13 is a section taken along the line $ff$ in Fig. 12, with portions in a different operative position.

Fig. 14 is a section taken along the line $gg$ in Fig. 11.

Fig. 15 is a section taken along the line $hh$ in Fig. 17.

Fig. 16 is a view of one portion of the mechanism in one operative position.

Fig. 17 is a plan view of the mechanism in Fig. 18 taken along the line $jj$ in Fig. 18, portions being broken away.

Fig. 18 is a partial section taken in part on line $kk$ of Fig. 17.

Fig. 19 is a similar view to that of Fig. 18, except it is taken in part on line LL in Fig. 17.

Figs. 20 to 37 show the pretzel and its blank in various stages of manufacture together with fragments of the associated mechanism.

Fig. 38 is a diagram giving one recommended timing for the various sequences.

Fig. 39 is an enlarged section taken along the line $nn$ in Fig. 16, portions being removed.

Fig. 40 shows a portion of the mechanism disclosed only partially in Fig. 5.

Referring to the drawings. A conveyor I is indicated, (Figs. 4, 5, 12, and 16). This conveyor preferably is that one now used to convey the pretzels thru the solution which is used to brown them. We have shown no means of driving this conveyor and our present invention does not connect thereto or form any part thereof, other than as a means of supplying pretzels thereto.

Our present invention includes six extruding heads A, (Figs. 1 and 4) and six pairs of receptacles B. Dough slugs 2 (Fig. 5) are conveyed by chutes 3 to the interior of the extruding heads. These slugs are now made and machine rolled to form the elongated blank which is at present manually coiled by girls into the shape of a pretzel. However we desire to have these slugs of dough conveyed, not to the present rolling machine but to the chutes 3. One chute will be provided for each of the six heads A. We have shown no detail of these chutes other than their indication in Figs. 5, 21, and 23. Neither do we show any conveyor which might feed them. We also do not show the dough slug forming machine, as the forming of the slug and its special conveyance to the chutes 3 forms no part of our present invention. It is evident that slugs of dough can be formed by many methods, and that these slugs can be conveyed to the extruding cylinders in any manner which is adaptable to this purpose, and in keeping with our present new method.

As the dough slug extrudes from the heads A it takes the shape of a long slender blank and this is deposited as fast as extruded upon one of the sections of the receptacle B. As the blank is deposited the extruding head is given a motion that will cause the deposit of the blank to be along a path the shape of the loop of a pretzel. This movement and extrusion is indicated in Figs. 20 to 33. As the extrusion reaches the position of Figs. 34 and 35, a trap door 6, (Fig. 35) is moved to its position in Fig. 36, this causing the downward hanging end of the dough blank to be elevated into correct posture on the pretzel. The receptacle B is then elevated so that the contacted end portions of the blank are pinched against the respective looped portions of the pretzel. (Fig. 37.) The receptacle is now lowered and moved sideways from beneath the head. Next it is rapidly swung about its pivot in direction of arrow 7 (Fig. 16) to the full line position of that figure where the pretzel 64 falls upon the surface of the moving conveyor.

The detailed structure of the mechanism is as follows:

Extruding heads

Each head consists of a cylinder 8 having a bore at its upper end large enough to hold a dough slug 2. A bottom wall formed at its lower end contains a small hole 9 thru which the dough is extruded in the correct diameter required for the pretzel. As a means of forcing the dough thru the hole 9, we use plungers 4. These are each pivotably connected at their upper ends to one end of a link 10, the opposite end of each link being pivotably connected to the outer end of a lever 11, the opposite end of each lever being fixed to a shaft 12, or 13. Also fixed to each of the shafts are levers 14. To the end of each lever 14 is pivotably connected a yoke 15. Threaded into each of the yokes is one end of an adjusting rod 16. Nuts 17 serve to retain the rod in correct relation to the yokes. It is evident that any movement which may be imparted to shaft 13 will also thru the rod 16 be likewise imparted to shaft 12. Also that movement in one direction will cause all the plungers 4 to descend and in the opposite direction to ascend. These plungers are guided for reciprocation in bearing 18 formed with and as a part of the casting which includes the cylinders 8. These cylinders and bearings are also formed with and as a part of a main supporting member 19. Extending up from this member are bearings 21 into which the shafts 12 and 13 are journaled for rocking movement.

Extending rearward the member 19 terminates in a slide portion 20 (Fig. 9), which is fitted for sliding movement in ways forming a part of a second slide 21. See also Fig. 3.

*Method of moving the extruding head plungers*

Formed as a part of the slide 21 is a bearing 22 in which is journaled for rotation a shaft 23. To the upper projecting end of the shaft is fixed a cam 24. This cam is provided with two cam paths. Coacting with the one path along its outer periphery is a roller 25. (Fig. 1.) This roller is mounted for rolling movement on a pin passing for bearing thru one end of a lever 26. The lever at its opposite end is formed as a spiral gear sector 27 with teeth in mesh with a spiral gear 28. Intermediate its ends the lever is pivoted for rocking movement on a pin 29 which extends from the member 19. The gear 28 is fixed to shaft 13. The thread of the spiral in gears 27 and 28 is made suitable so that as rotation is applied to cam 24 the cam on its outer periphery as it contacts the roller 25, will cause the shaft 13 to be rocked in the direction of arrow 175 (Fig. 5). As a means of maintaining the roller 25 against its cam path, we have shown in the present instance a coil contractile spring 32, (Fig. 5) attached at one of its ends to a portion of member 19 and to its opposite end to one end of a lever 33 which extends from and is fixed to the shaft 13. This spring it is evident, serves to elevate the plungers 4 while the cam 24 serves to lower them. As a means of rotating the shaft 23, we have fixed to its lower projecting end a gear 34. With the shaft passing freely for rotation therethru, are ends of a pair of links 35 and 36 (Fig. 9). Meshing with this gear 34 is a gear 37 (Fig. 10). Adjacent each side of gear 37 are links 38 and 39. The links 38 and 39 fit into and between the inner surfaces of links 35 and 36. A pin 40 passing thru the respective ends of the links and thru the gear 37 is fitted with a nut at each end for its retention. The pin is adapted for free movement in the linkage and the gear 37 is arranged for free rotation over it. Extending past the pin 40 the links 38 and 39 have passing freely for rotation thru their other end a shaft 41. This shaft is journaled for rotation at its lower portion in a bearing 41a extending from and formed as a part of a base plate 42. At its upper end the shaft is journaled for rotation in a bearing 43 formed in a bracket 44 fastened by bolts, not shown, to the extension having bearing 41a. The links 38 and 39 are provided with bearings at their ends opposite the pin 40, thru which rotatively passes the shaft 41. Fixed to the shaft between the links is a gear 37a, which is in mesh with the gear 37 and thru which rotation when applied to shaft 41 serves to rotate shaft 23. To its lower projecting end shaft 41 has fixed a bevel gear 45 which is in mesh with a gear 46, which is fixed to a shaft 47. Adjacent gear 46, the shaft is journaled for rotation in a bearing 48, extending from and forming a part with the base plate 42 (Fig. 1). Extending thru this bearing the shaft passes, journaled for rotation thru bearings formed in the walls of a gear case 49. Internal of the gear case the shaft has fixed thereupon a worm gear 50. (Fig. 1). Meshing with the gear is a worm 51 fixed to a shaft 52 which passes journaled for rotation thru to external of the gear case, where it is attached to the shaft of a motor 53, by a coupling 54 (Fig. 4).

It is now evident that rotation of the motor shaft will revolve cam 24 and that the plungers 4 will be moved up and down.

*Method of causing the extruding heads to move thru a path which traces the shape of a pretzel*

To cause each head A to trace a path following in the looped formation of a pretzel, movement must be given to the member 19 simultaneously in two directions. To give movement in the direction of arrows 55 (Fig. 1) we provide the internal cam path 56 in the cam 24 (Fig. 3). Arranged to roll thru this path is a roller 57 mounted for rolling movement over a pin 58 extending from a boss formed as a part of the slide 20. It is evident that as the cam 24 is revolved that the slide 20, member 19, and all heads A will receive a motion in the direction of first one and then another of the arrows 55.

For providing a movement of the heads A in the directions of the arrows 59 (Fig. 1) we provide a cam 60 (Figs. 1 and 9). In the path of this cam coacts a roller 61 rolling over a pin 62 extending from a bracket 63 which is fastened by screws, not shown, to the slide 21. The cam is fixed to an extending portion of the shaft 41 for receiving rotation therewith when the motor 53 is actuated.

It is evident that as the cam receives rotation, the slide 21 will move first in the direction of one of the arrows 59 and then contra-wise in the direction of the other of the said arrows. It is also evident that slide 20 will receive this same movement and that this will be in addition to that movement it receives thru the directions of arrows 55. It will be apparent now that slide 20 in receiving this compound travel will cause the member 19 and all the associated heads A to also receive the same compound travels. We desire to select for the cam paths responsible for this compound travel such paths as will produce movement of the heads A thru the path indicated by the position of Figs. 22 to 36 and then back to that position of Fig. 22. During this compound travel the dough slug 2 is being pushed thru the hole 9 and deposited upon one of the sections of its associated receptacle B. As the dough emerges thru the hole 9 it assumes the diameter necessary for the pretzel blank 64. Referring to Fig. 22. Here the head A is being dwelled above the receptacle portion 65 until the blank 64 is formed so as to just touch it. See also Fig. 23. Movement of the head A now starts in the direction of arrows 66, in Fig. 24, the view in Fig. 25 showing how it looks in elevation. Continuing thru a movement in direction of arrow 67, (Fig. 26) the blank is formed into a first loop, see also Fig. 27, and continuing on in direction of arrow 68, in Fig. 28 and arrow 69, in Fig. 30, the blank is formed into its second loop. Figs 29 and 31 indicate the elevation of the studies in Figs. 28 and 30. The piston 4, during this head travel continues to descend in a uniform manner, so as to insure a continuous uniform placement of the blank. As the position of Fig. 30 is reached the head A dwells at rest, while the blank continues to be formed. A hole 70 is provided in the members 65 (Fig. 33) and continuation of blank formation is permitted as the blank starts to fold into this hole. As the position of blank indicated in Fig. 33 is reached, a knife 5 moves to cut off relation with respect to the blank and upon severance, the cut end of the blank falls by gravity thru the hole 70 into the position of Fig. 34. The movement of the head A can now be continued and the head can again be brought to a rest in its starting position of Fig. 22. It is our desire to select as a path for the outer periphery surface of cam 24, such a path as will give uniform descent to the pistons 4. The lever 26, being pivoted on slide 20 takes the full compound travel of the slide, while the cam merely reciprocates thru the directions of the arrows 59. The path we indicate in Fig. 1, approximates one desirable timing. The other path of cam 24 and the path of cam 60 also are approximately typical of the path needed to obtain the compound movement in the slide 20. It is evident that these paths can be changed to permit variable pretzel dimensions to occur. It is also evident that various sizes of pretzels can be made on the same machine merely by a changing of the cams, within the limits of the remaining mechanism of the machine.

*Method of folding the final loop of the pretzel so as to form what is called the twist*

As the blank 64 assumes its shape and the posture indicated in Fig. 34, a door 6 (Fig. 35) is moved to the position of Fig. 36. Figs. 35 and 36 are taken along line *mm* in Fig. 34, Fig. 36 departing in that here the end of the blank is shown elevated by the door closure. As a means of pinching both ends into the associated looped portions of the pretzel blank we cause the member 65 to be elevated to the position of Fig. 37. These end portions of the blank are now pinched between lugs 71 and 72, formed on the under side of the head A, and the top of member 65. The member 65 is now returned to its position of Fig. 36, with the pretzel thereupon in completed formation. Each receptacle B is formed by a pair of members 65. Hereinbefore we refer to them as members 65, and in Figs. 23, 25, 27, 29, 31, 33, 34, 35, 36, and 37 we show one of the pairs, indicating it by the common numeral 65.

Hereinafter to distinguish the operation of each separate member of each pair and again the operation of different of the pairs, we affix the letters *a*, *b*, *c*, and *d* to the numeral 65. It will be understood that this is done so as to clear up the description and that in the figures where the numeral 65 occurs without said letters affixed an operative effect common to all the members 65 is being referred to.

*Method of moving the receptacles and their doors*

Extending past the gear box 49, on the side opposite bracket 48, the shaft 47 is journaled for rotation in a bearing 73 formed as a part of a bracket 74 which extends down to and is fastened by screws, not shown, to the base plate 42. To the end of the shaft adjacent the bearing 73 is fixed a bevel pinion 75 which is in mesh with a bevel gear 76. Gear 76 is fixed to one end of a shaft 77, which is journaled for rotation in a bearing 78 formed with the bracket 74, and in a bearing 79 formed a part of an extension 80 of the base plate (Fig. 4). Fixed to the other end of the shaft 77 is a bevel gear 81, which is in mesh with a bevel gear 82 fixed to the lower end of a shaft 83. This shaft extends upward, journaled for rotation in bearings 84 and 85 formed a part of the extension 80, and in a bearing 86 formed a part of a bracket 87 fastened by screws not shown to the upper face of the extension 80. To its upper end the shaft has fixed a bevel gear 88 which is in mesh with a bevel gear 89. This last gear is fixed to a shaft 90, which passes to either side thereof, journaled for rotation in bearings 91 and 92 also formed with and as a part of the bracket 87. Adjacent bearing 92 the shaft has fixed thereon a cam 93 which contains a path 94. Projecting into and guided by this path is a roller 95, arranged for rotation upon a pin 96 extending from a slide 97. At the top and bottom of the slide are ways 98 and 99 in which the slide is adapted for reciprocation, as movement is imparted to it from the roller 95 as it moves thru the path 94 upon rotation of the cam. We have indicated these guides extending substantially the width of the machine, (Figs. 17, 5, and 1). We have also indicated the slide as one long member. Formed with the slide as a part thereof, are members 100, 101, and 102. Each of these members serves as a supporting means for two pairs of the receptacles B. There are six extruding heads, each served by a pair of receptacles. There are three pairs adjacent to the face of the cam 93 and three pairs which are suspended over the end of the conveyor. Each pair of receptacles includes two members 65. Referring to those that are adjacent to cam 93. Each member is provided with bosses 107 at one end thru which passes a pin 103 (Figs. 17, 18, and 19). The member and boss are free to rotate upon this pin. Extending up between the members (Fig. 17) is member 101, the pin 103 is fixed in a boss therein, and passes to each side for the support of members 65. At each outer side of the members 65 the boss 107 is enlarged with gear teeth 104 cut therein. Retention of members 65 upon the pin 103 is had by a washer 105 and a screw 106 threaded in each end of the pin. Each hub 107 is cut away intermediate its ends to provide for twist coil springs 108, one end of each spring being fixed into a hole 109 in the pin 103, the opposite end resting upon the upper side of each associated member 65. The purpose of these springs is to yieldingly retain each member 65 against its stop 110 that extends from the adjacent sides of the member 101.

Cut thru each member 65 is a hole 70, adapted to be closed by a door 6. At one end of the hole is formed a stop 111, which limits the travel of the door as it passes to open position. At the opposite end is located a latch 112, yieldingly pressed by a spring 113 into locking engagement with the door when it is in its closed position. The latch is fixed to one end of a shaft 115 which passes for rocking movement thru a bearing 116 extending from the end of the member 65. One set of doors 6 and latches 112 are provided for each of the six members 65.

At the opposite extending end of each shaft 115 is fixed a lever 114, adapted to contact with the end of member 65 for limitation of latch movement when the door is open and also as a means of releasement for the door when its opening is desired, as is more fully referred to again hereinafter.

Member 101 as well as members 100 and 102 extend from and form a part of the slide 97 which is guided for reciprocation by the before referred to guide ways 98 and 99. At suitable intervals extensions 118 pass from the guides downward into contact with the base plate 42. These extensions are indicated in Figs. 5, 18, and 1, and they are to be fastened to the base by bolts not here shown, or in any suitable manner.

In Fig. 17 one of the members 65 is shown beneath one of the extruding heads A, receiving a blank of dough. The associated member 65 is shown to one side of the head A, and in a position where it is ready to be moved for deposit of its pretzel upon the conveyor 1. The blank under the head A has been deposited in the looped formation of the pretzel by the compound travel imparted to the head by cams 24 and 60. In Fig. 17 the blank is shown as having reached the position indicated also by Figs. 30 and 31. The head A now dwells in this position, dough continues to extrude from the head, the knife 5 cuts off the end of the blank, it falls to the position of Fig. 34, the door 6 is closed and the position of Fig. 36 is reached, then the ends are pinched to the loop of the pretzel. The closing of the door 6 is accomplished by the movement of the cam 120 formed on the outer periphery of cam 93. This contacts roller 121 which is held for rotation upon a pin 122 which projects between the walls of a clevis formed in the one end of a lever 123. The other end of the lever is fixed to a shaft 124 which extends across the machine and is carried by and journaled for rotation in bearings 125 formed a part of the extensions 118. At suitable locations along this shaft are fixed six levers 126 which at their outer ends have a clevis which guides for rotation on a pin 127, rollers 128, the pins passing for support thru the wall of the clevis. Each door 6 is provided with a lever 129 which contacts at its upper end with a projection 130 extending down from the door. These levers are fixed at a point intermediate their ends onto shafts 131 which pass for bearing support thru bosses 132 extending from and forming a part of members 100, 101, and 103. (Fig. 15.) The levers extend down from their connection to shafts 131 into alignment for abutment with rollers 128. Figs. 18 and 36 and 5 show positions where the cam 120 has caused the door to close. The lever 126 during this closing movement passes from the dotted position to its full line position (Figs. 5 and 18). Each door is provided with ears 133 which extend to interference with the under side of each member 65. As the door is closed by this lever action a tendency to raise the member 65 about its pivot is present but movement in the member is rstrained by the spring 108. However to provide the pinching effect of the ends of the blank, as before referred to, we provide a certain excess travel to lever 129 as indicated by its two positions shown in Fig. 37 so that after the door is closed and the ears 133 are contacted with member 65, that the excess travel will push the lever 129 to its position of Fig. 37 to raise the member 65 to its position there shown. We provide the bosses 71 and 72 on each head A to interfere with the folded pretzel at the suitable spots for the end pinching operation. Cam 120 now revolves to off contact on the roller 125 and the levers 126 and 124 move to their dotted position indicated in Fig. 5, a coil contractile spring 134 (Fig. 5) serving to effect this return. As a means of maintaining the roller 121 in constant contact with cam 120 we have provided an arm 177 (Fig. 5) fixed at one end to some place on shaft 124. From the shaft it extends out and is provided with a counter weight 178 (Fig. 43) fastened by screws 179 thereto.

The member 65 now returns to its position of Figs. 18 and 36, and the cam 93 thru the roller 95 and slide 97 acts to slide the member from under its associated head A, the other of the pair of members 65 now being moved to under the head for the reception of the next pretzel to be made. For the dumping of the completed pretzel upon the conveyor 1 we provide that the shaft 90 extend past the cam 93, trunnioned in a bearing 136 formed a part of a bracket 137 (Fig. 4). Extending past the bearing, the shaft has fixed thereto a gear 138 in mesh with a pinion 139, which pinion is again simultaneously in mesh with a gear 140, which is fixed to one end of a shaft 141, which is trunnioned for rotation in a bearing 135, also formed a part of the bracket 145 fastened by screws not shown to the bracket 137. Pinion 139 is fixed to a shaft 146 which is held for journaled support in a bearing formed a part of a bracket 147, also held to bracket 137 by screws not shown. Considering now only the one shaft 146. This is provided with six segmental pinions 147 fixed thereto at spaced intervals so that during the sideway travel imparted to members 65 by the cam 93, three of the sets of teeth 104 will mesh with three of the pinions 147 at one operative position of the members 65, and then inversely the other three sets of teeth 104 will mesh with the other of the three pinions 147 at the other operative position. In Fig. 11 only the one pair of members 65 are shown relative to shaft 146 but it will be understood from Fig. 1, that three sets are therealong spaced. As shaft 90 revolves, shaft 146 is revolved and those members 65 that have their teeth 104 positioned for engagement with the teeth of the pinions 147 will receive a rotative movement thru that portion of a circle established by the number of teeth contained in the pinion and the mating portion of the member associated with it. We have selected as a suitable timing one where pinions 147 engage for the movement of the member just after the member is moved from beneath its head A. The movement resulting from this toothed engagement is illustrated in Fig. 16 in the direction of arrow 7. The full extreme travel is shown by the full line position, at which position the lever 114 has contacted with a pin 148 extending from the side of the member 101 and the latch 112 has been released, permitting the coil spring 149 to return the door 6 to its open position. These coil springs are set into an enlarged bore 150 at one side of each of the members 65, one end of the spring being fastened into the member and the other end into the hole in the end of the shaft. This spring is twisted sufficiently to give the pressure required to normally retain door 6 in its opened position of Figs. 19 and 16. As the member 65 is moved in direction of the arrow 7, increased pressure is stored in the spring 108 and as the teeth 104 leave contact with the teeth in pinion 147, as the full line position (Fig. 16) is reached, the pressure stored in this spring will snap the member 65 back against its stop 110 (Fig. 18.) Another pretzel has by this time been deposited upon the other of the pair of members 65 and the cam 93 now acts to move the member just unloaded again to receiving position beneath the head A, the loaded member passing to its side for unloading.

In the foregoing portion of this description reference has been generally made only to the three pairs of mebers 65 lying adjacent to the face of cam 93. The other three pairs which extend over above the conveyor 1 are supported and operated as follows.

Members 100, 101, and 102 extend out from their connection to the first three pairs of members, passing over the conveyor so as to act as a support for the second three. (Figs. 1 and 11). These respective member pairs are staggered so that a uniform deposit of pretzels will be had on the conveyor. In the position of Fig. 1, pretzels will be deposited on the center lines 151, one to each center line or a total of six, then cam 93 will move the members 65 to their dotted positions, Fig. 1, and six more will be deposited, but this time one on each center line 152. This method insures a uniform distribution of pretzels over the surface of the conveyor so that it is quickly and easily filled to its capacity. The conveyor is in the meantime to be driven by its own power, in the direction of arrow 153, (Figs. 1 and 16) so that unfilled portions of the conveyor are continually being exposed to the loading action of the members 65.

To move the overhanging three pair of members 65 for unloading effect we have provided the shaft 144. Pinions 147 are spaced thereupon, for engagement with teeth 104 for the same purpose and in the same manner as those first described. In Fig. 11, the one pair of members of the first three described have been designated as 65a and 65b. Their opposing pair of the second three sets are designated as 65c and 65d. In this figure members 65b and c are shown ready for a dumping operation to start. After dumping they will be moved in the direction of arrow 154, and the members 65a and d, by this time having pretzels thereupon, will be brought to their dumping position. In this Figure 11 the pinion 147 for driving member 65b is shown engaged with its associated teeth 104. Those for members 65a and 65d are disconnected, and those of 65c connected. The reversal of these engagements upon movement of cam 93 will be evident.

Shaft 144 is driven from shaft 99 thru gears 138, 139, rotating gear 140 on shaft 141, which drives thru gear 142 the gear 143 on the shaft 144. Shaft 144 as well as shaft 146 extends across the conveyor 1, and both are journaled for rotation in bearings 156 and 157 formed in a bracket 155 extending from the base plate 42. Collars 158, pinned onto each shaft, adjacent each side of the bearings 156 and 157 serve to eliminate end movement in the shafts as the bearings formed in members 100, 101, and 102 are sliding thereupon as the members 65 are moved by the cam 93.

The at rest positions of members 100, 101, and 102 must always be exactly between a pair of the center lines 151 or 152, which permits of the depositing of the pretzels on each side of each member. Due to the staggered positions necessary for members 65 it is required that members 65c and 65d be located to one side of their supports 100, 101, and 102. In Fig. 11 the member 101 is shown. A pin 103a is fixed in member 65c and passes for rocking movement thru bearings 158 and 225 formed in member 101. Extending past bearing 158, the pin has fixed to its outer end the hub 104a, containing the gear teeth 104. The bearing 225 is only half occupied by the pin 103a. Fixed into the remaining portion of the bearing is a pin 226. Over the extending end of this pin is sleeved the member 65d, this being similar to 65a and 65b in that the teeth 104 are here again formed a part of an extension of the hubs 107. The operation of members 65c and d by shaft 144 will now be evident and easily understood as being the equivalent of that similar operation described for members 65a and 65b, by means of shaft 146.

Members 65c and 65d have doors 6, the same as in members 65a and 65b. These are opened and closed as follows. The shaft 131 operating the door in member 65b (Fig. 15) has fixed to its inner end a lever 159. The shaft 131 which operates the door in member 65a, has fixed to its inner end a lever 160. To the outer end of lever 159 is pivoted onto a pin 161, one end of a link 162. To the outer end of lever 160 is pivoted onto a pin 163 one end of a link 164. These links pass upward thru a slot 165 in the member 101, (Fig. 11) link 164 to a pivoted connection on pin 166 extending from one arm of a two arm lever 167, which is rockably mounted upon a pin 168 passing thru the associated walls of the member 101. Link 162 passes from its pivoted connection to lever 159 to a pivoted connection on pin 169 extending from one arm of a two arm lever 170 which is rockably mounted upon a pin 171 also passing thru the associated walls of the member 101. To the other arm of lever 170 is pivoted one end of a link 172, the other end of the link being pivoted upon one end of a lever 173 which extends from fixed contact on a shaft 174. To the other arm of lever 167 is pivoted one end of a link 175, the opposite end of the link being pivoted to the end of a lever 176 which extends from fixed contact on the end of a sleeve 177, passed freely over the shaft 174 and journaled for bearing support in a bearing 178 formed a part of the member 101. At its opposite end the sleeve has fixed thereto a lever 179 similar in all respects to the upper end of lever 129 for operation of the door 6. Extending past the sleeve 177 the shaft 174 is journaled for bearing support in a bearing 180 also formed a part of member 101. To the emerging outer end of the shaft is fixed a lever 181, also similar in all respects to the upper end of lever 129. Bearings 178 and 180 are formed a part of member 101 together with the bearing 182 thru which passes shaft 144. (Fig. 11.) It is evident that as cam 120 closes the door 6 in member 65a that the door 6 in member 65d will also be closed. Also that as the door in member 65b is closed so will the door in member 65c be closed. While springs 108 serve to return members 65a, 65b and 65d against stops 110, yet in the case of member 65c we require a differently arranged spring 183. (Fig. 11.) One end of this spring is fastened into a hole 184 in the shaft 103a, and the opposite end is contacted back under the boss forming the bearing 182. As pinion 147 rotates to twist shaft 103a to move member 65c thru a dumping operation, energy is stored in the spring 183. The foregoing description for member 101 and its appended mechanisms also covers similar mechanisms appended to the similar members 100 and 102 in the same manner and for the same purpose and effect.

*Method of operating the blank cut off knife*

Arranged to slide against the under side of the heads A are knives 5. To operate each knife we provide levers 184 and 185. There are three levers 184, one for each of the three heads A which extend over the conveyor 1. There are three levers 185, one for each of the heads A which lie adjacent to the cam 93. These levers 184 and 185 are clevised at their lower end over enlarged ends of the knives 5, a pin 186 passing thru the walls of the clevis and thru the enlarged end of the associated knife, serving to pivotally connect the two. A lug 187 extends from both levers 184 and 185. A lug 188 extends rearward from each knife and a spring 189 interposed between the two lugs tends to yieldingly maintain the cutting edge of the knife 5 suitably against the lower surface of its associated head A. The upper end of each lever 184 is fixed to a shaft 190 which extends across the three heads A in this set. This shaft is trunnioned for rocking movement in bearing 191 formed a part of each head. At one point on the shaft is fixed a lever 192, to the outer end of which is pivotally connected the lower end of a link 193. The upper end of the link is pivotally connected to one arm of a three arm bell crank 194. To one of the other arms is hooked one end of a coil spring 195, the opposite end of the spring being fastened to a portion of the member 19. This spring is tensioned to maintain the bell crank and levers 192, 184 and knife 5 in their position of Fig. 5. The bell crank for its rocking movement is pivoted upon a pin 196 extending from a boss 197 formed a part of the member 19. To the third arm of the bell crank 194 is pivotally connected one end of a link 198. The opposite end of this link is pivotedly connected to an upstanding arm of a bell crank 199, pivoted for rocking movement about a pin 200 extending from a boss 201 formed a part of the member 19. To the other arm of the bell crank is pivotally connected the top end of a link 202 which extends down to pivoted connection with a lever 203. This lever extends back and is fixed to a shaft 204 which extends across its three associated heads A, also trunnioned for rocking movement in bearings 205 the same as is shaft 190. Levers 185 are fixed at their top end to this shaft. It is now evident, that when movement is imparted to a link 198 in direction of the arrow 207a all six of the knives 5 will operate to pass across the holes 9 for blank cut off purposes, and that when this impelling force is removed the spring 195 will contract for a return of the knives to their position of Fig. 5. As an impelling means we have provided a cam 206, formed on the upper surface of the cam 24 and as a part thereof. As rotation is applied to the shaft 23 this cam 206 is revolved to and from contact with a roller 207 carried for rotation upon a pin 208 extending from one end of a bell crank 209 which is mounted for rocking movement onto a pin 210 extending from a bracket 211, which extends from and is fastened to the member 19, by bolts, not shown. To this other end of the bell crank is pivotally connected by a pin 213, one end of a link 214, the opposite end of the link being pivotedly connected to the end of a lever 215 which extends from fixed connection to the shaft 200. It is evident, that when movement is imparated to the bell crank 209, by the cam 206, it will rock about its pivot pin 210 and that this rocking movement will be transferred to shaft 200, by the link 214, and to shaft 190 by link 198. It is also evident that roller 207 will be urged to follow the paths of the cam 206 by the action of the spring 195. Also that cam 206 will be located correctly to contact roller 207 during the correct dwell portion of the compound travel of the member 19.

*General operation and optional methods of construction*

While we have indicated individual dough slugs being placed one by one into each head A, yet it will be understood that large cylinders could be provided, filled with dough, and that extrusion could take place from these, to any or all of the heads A. We plan on later building some of these machines in this manner, and we wish it understood that the method of direct extrusion from a multiple supply direct to one or more of the heads A would not constitute a departure from our appended claims. Our present method of feeding individual slugs of dough is disclosed, as it is a preferred form at the present time, because it permits the use of a lot of the equipment now present in pretzel factories.

In Figs. 20 and 21, the dough slug is shown resting in the cavity 8, prior to descent of the extruding piston 4. This slug of necessity must fit very free within the cavity. This means that a lot of air will be present around it. To avoid pushing this air out with the dough thru the hole 9, we provide that the piston 4 be slightly undersize. Experiment has shown to us that the air will leave by passing around the piston upon its descent. Some dough may tend to squeeze between the piston and the walls of the cavity 8. However this clearance is kept small and only a negligible amount may at times pass for a short distance up the wall. To free the piston from dough that might by accident stick to its outer periphery we provide it with over travel on its upward stroke, so that it enters fully into the bearing 18. We leave the lower edge of this bearing sharp and as the bearing has snug sliding fit it acts as a scraper, if this action is ever needed. Hereinbefore we have described the extruding action as one where the entire slug of dough is substantially extruded each time, and where the knife 5 acts to free the extruded blank from the slight amount remaining in the hole 9. It will be evident that if the bottom of the cavity 8 be kept as thin as possible that the dough remaining in this hole will be reduced to a slight amount. To avoid the use of the knife, or at least to limit its use to that of a safety feature only, we have suggested an optional design of piston 4 in Figs. 6 and 7. We provide here a rubber tip 230, held to the lower end of the piston 4 by a metal holder 231, and a screw 232. The bottom of the cavity 8 is shown as having a tapered seat in these views. As the piston descends it forces all the dough out and the rubber tip takes the shape of the cavity, a small bit of rubber being forced into the hole 9, (Fig. 7) so that all dough is completely removed. The knife 5, if now used, becomes more of a guarantee only that the blank will fall away. The rubber used should be stiffer than the dough so that it substantially holds its initial shape during the first part of the extrusion, in order that the benefits obtained by the use of a steel piston are substantially maintained.

While our disclosure refers substantially to a complete elimination of the slug each time, it will be understood that we could extrude, say one half of the first slug, then the second slug could be deposited upon the remaining portion of the first. From now on each succeeding extrusion would issue a blank formed of portions of two slugs and a blank substantially uniform in weight in proportion to the mean proportional weight of the two slugs of dough out of which it is formed. We find by experiment that the two slugs become welded to each other as they pass towards and thru the hole 9 and that the emerging blank 64 is free from fractures or breaks.

We have mentioned these varying conditions to insure that their use is evident, allowable and controllable for varying designs that may be made and that departures from our disclosure along these lines, would not constitute a departure from our claims within their scope, and intent.

The chutes 3, feeding the heads A, which overhang the conveyor 1 are shown (Fig. 5) leading into the cavity 8, from the front of the head. The chutes we show feeding the heads A which lie adjacent to the cam 93 are shown leading in from the side, so as to clear the members 203 and 185. It will be understood that these chutes could be fed with the dough slugs 2 by hand, or by automatic means which would include conveyor and elevating equipment, escapement movements, etc. However, our present disclosure is one covering a pretzel forming machine, and the special means by which dough is supplied thereto is not pertinent. It is also evident that while we have mentioned a single slug or even two being present in the cavity 8, that even more, three, four or five slugs could be placed therein. The extrusion of each stroke of the piston would then be entirely dependent upon that displacement incident to the stroke. In our present drawings we only show cavity 8, sufficient in depth to contain one slug. However, dimensional changes would not affect our claims and it is evident that the cavity can be enlarged to hold a plurality of slugs. It will also be evident that if it is enlarged to hold two or more slugs that the bottom position in the stroke of the piston 4 will have to be dimensioned so that only one blank is extruded in any single operation thereof. It is also evident that the walls of the cavity 8 can be arranged for water cooling although we have not so shown it.

As the extruded blank 64 is moved into the shape of a pretzel we provide bosses 249 to slightly confine it. These are only shown in Figs. 17, 18, and 19, but it will be understood that they also apply to all views of the receptacles 65 and that where not shown their elimination has been only for obtaining clearness in the drawings. These lugs are required for the stiffer doughs as in a high speed machine the dough in being pulled around its bends may go out of its correct loop formation. As the extrusion reaches the position of Figs. 30 and 31, movement in the head A ceases, extrusion continues to the position of Fig. 33 and the knife 5 moves to free the blank 64, so that it falls to the position of Fig. 34. Views 33 and 34 are substantially along a line PP in Fig. 32. Fig. 35 is taken along line *mm* in Fig. 34.

In falling to the position of Figs. 34 and 35, a certain time element is present. The falling of this end is expedited also by any decrease in the dimension 227 (Fig. 33). It is not required that the falling end take the exact straight down hanging position we show. It may retain a slight kink. All we need for one operative result is that the end become sufficiently straightened to position itself on the door 6, for contact within any suitable predetermined range on the associated portion of the loop of the pretzel upon door operation. Experiments have shown that only a slight time is required for this falling of the end. We have not shown mechanical means in our present disclosure to hasten this falling. However it will be evident that many mechanical movements can be provided to push the dough end down should occasion require. We wish it understood that application of any such means to our disclosure for this purpose would not affect our appended claims within their limit and scope.

Formation of the pretzel now proceeds to its pinching operation, (Fig. 37) then to its dumping upon the conveyor 1, all as hereinbefore brought out. In Fig. 38 we show a suggested timing thru which the various sequences of our method pass. Reading in the direction of arrow 233.

Distance 234 indicates the time required for piston 4 to be elevated and a slug 2 to be inserted into cavity 8. Distance 235 indicates the time that the dough is extruding. Then distance 236, the time cut-off knife 5 operates. Thru distance 237 the trap door 6 closes and the ends are pinched as in Fig. 37. Thru distance 238 that receptacle 65 which has just received a pretzel, is moved over for discharge of the pretzel, and the empty receptacle is brought under the head A. Thru distance 239 the receptacle dumps the pretzel just made onto the conveyor 1. Thru distance 240 the receptacle dwells. Thru distance 241 the slide 20 is moved thru its pretzel forming movement and thru distance 242, the slide 21 is likewise moved thus giving the compound travel to all heads A as desired. Slide 20 now dwells thru distance 243, and slide 21 dwells thru distance 244 to permit the extrusion shown in Fig. 33, then the slide 20 moves thru distance 245 to again bring the head A to a start for the next compound travel. It will be evident that one set of pretzels is formed for each revolution of cams 24 and 60 and that two sets of pretzels are formed for each single revolution of cam 93. This requires that the R. P. M. speed of this cam be just one half that of cams 24 and 60. Certain of the movements have been shown as positive cam propelled in one direction with spring propelled returns, but cammed returns could be used. Also it is evident that instead of giving the compound travel to the heads A, that designs could be used where the receptacles B received this and the heads A are fixed, all without departing from our claims.

We wish it understood that the particular machine and the different parts thereof illustrated and described are merely a typical embodiment of one form of our invention, and that the specific construction described herein is merely by way of illustration and not by limitation or narrowing of our claims, as obviously, a great many changes in construction and design can be made without departing from our invention and obviously also various of the features described can be omitted leaving the machine still operative to usefully do certain of the work described and such changes are contemplated by us and would not involve any departure from our invention.

Having thus described our invention what we claim as new and desire to secure by Letters Patent is:

1. In a mechanism of the class described for forming pretzels having a twisted loop formation, a receptacle, a hole therein, means to deposit a dough blank upon the receptacle, the said depositing means being guided to partly shape the said pretzel and to permit the end of the dough blank last deposited to fall into the hole and means to then elevate it into contact with the previously formed portion of the pretzel, to form the twisted loop formation.

2. In a mechanism of the class described for forming pretzels having a twisted loop formation, a receptacle, means to deposit a dough blank upon the receptacle, the said depositing means being guided to partly shape the said pretzel and to permit the end of the dough blank last deposited to fall thru the previously formed portion of the pretzel, and means to then elevate the said blank end into contact with the said previously formed portion to complete the twisted loop formation.

3. The method of making a pretzel having a twisted center of the class described, consisting in making a strip of dough and bending it to form a first loop, then closing the said loop by contacting the strip with one end, then continuing the bending of the said strip to form of it, in conjunction with one side of the first loop a second closed loop and in then passing the other end of the strip thru the first loop and then to move the last referred to end into contact with the second loop to complete the twisted center formation.

4. The method of making a pretzel having a twisted center of the class described, consisting in making a strip of dough and bending it to form a first loop, then closing the said loop by contacting the strip with its one end, then continuing the bending of the said strip to form of it, in conjunction with one side of the first loop a second closed loop and in then passing the other end of the strip thru the first loop and then moving the last referred to end into contact with the second loop to complete the twisted center formation, and then to press both the said ends onto their contacted portions of the respective loops to cause them to adhere thereto.

5. In a mechanism of the class described, a shaft, a first segmental gear fixed to the shaft, a pivot, a receptacle mounted for rocking movement about the pivot, a second segmental gear fixed to the receptacle, means to rotate the shaft and the first segmental gear for engagement of its teeth with the teeth of the second segmental gear for movement of the receptacle in one direction about the pivot and means for moving the receptacle in a reverse direction when the respective teeth of the two segmental gears leave contact with each other upon continued rotation of the shaft, and means to form a pretzel upon the receptacle for discharge therefrom as the receptacle is moved in the first referred to direction.

6. A machine of the class described for forming pretzels having a twisted loop formation, comprising a piston, a cylinder therefor which is adapted to receive a slug of dough, a head for the cylinder, a hole in the head, means to force the piston into the cylinder so that a dough slug therein will be extruded thru the hole as a pretzel blank, a receptacle for receiving such a blank, means to partly shape the said pretzel as it is deposited upon the receptacle and to permit the end of the blank last deposited to pass thru the previously formed portion of the pretzel and means to then move the said blank end into contact with the said previously formed portion to complete the twisted loop formation.

7. A machine of the class described for forming pretzels having a twisted loop formation, comprising a piston, a cylinder therefor adapted to receive a slug of dough, a head for the cylinder, a hole in the head, means to force the piston into the cylinder so that a dough slug therein will be extruded thru the hole as a pretzel blank, a receptacle for receiving such a blank, means to partly shape the said pretzel as it is deposited upon the receptacle and to permit the end of the blank last deposited to pass thru the previously formed portion of the pretzel and means to then move the said blank end into contact with the said previously formed portion to complete the twisted loop formation, means to pinch the said end at its said contacted point to cause it to adhere to the said previously formed portion, and means to automatically effect discharge of the pretzel from the receptacle.

8. In a mechanism of the class described for forming a pretzel having a twisted loop formation comprising dough strip depositing means and dough strip receiving means, at least one of the said means being guided to partly shape the said pretzel as it is being deposited upon the receiving means and to permit the end of the dough strip last deposited to fall thru the previously formed portion and means to then move the said end into contact with the said previously formed portion to complete the twisted loop formation.

9. In a machine for forming pretzels having a twisted loop formation, a receptacle, means to deposit a dough blank upon the receptacle, the said depositing means being guided to partly shape the said pretzel and to permit the end of the dough blank last deposited to pass thru the previously formed portion of the pretzel, the said guiding means including a first cam and a second cam, the first cam being operable to move the second cam thru a definite straight line path while the second cam moves the depositing means at an angle to the first path, means to move the cams and means to move the said last deposited end of the blank into contact with the said previously formed portion to complete the twisted loop formation.

10. In a machine for making pretzels having a twisted loop formation, a stationary frame, a receptacle carried by the stationary frame, a movable frame, a dough blank extruding means carried by the said movable frame, the movable frame being guided to partly shape the said pretzel and to permit the end of the dough blank last extruded to pass thru the previously formed portion of the pretzel, the said guiding means including a first cam and a second cam, the first cam being operable to move the second cam thru a definite straight line path while the second cam moves the movable frame at an angle to the first path, means to move the cams and means to move the said last extruded end of the blank into contact with the said previously formed portion to complete the twisted loop formation and automatic means to remove the pretzel from the receptacle.

11. In a machine for making pretzels having twisted centers of the class described, means to form a strip of dough, means to bend a first portion of the strip into a first closed loop and a second portion in conjunction with one side of the first closed loop into a second closed loop and to permit the remaining portion of the strip to pass thru the first loop and means to move the last referred to portion into contact with the second closed loop to complete the twisted center formation.

12. In a machine for making pretzels having twisted centers of the class described, the combination with a receptacle adapted to receive a pretzel, of means to deposit a strip of dough upon the receptacle so as to form a first loop, means to close the said first loop by contacting the strip with the first end deposited, means to continue the depositing of the dough strip to form of it in conjunction with one side of the first loop a second closed loop and to permit the last end deposited to pass thru the first loop and means to then move the last referred to end into contact with the second loop to complete the twisted center formation.

13. A mechanism of the class described for forming a pretzel having a twisted loop formation, comprising dough strip depositing means and receiving means for the said strip, at least one of the said means being guided to partly shape the said pretzel as it is being deposited upon the receiving means and to permit the end of the dough strip last deposited to pass thru the previously formed portion of the pretzel and means to then move the last referred to end into contact with the previously formed portion to complete the twisted loop formation.

14. A mechanism of the class described for making a pretzel having a twisted loop formation comprising dough extruding means for extruding a dough strip and a receiving means for receiving the said dough strip, at least one of the said means being guided to partly shape the said pretzel as it is being extruded upon the receiving means and to permit the last extruded end of the dough strip to pass thru the previously formed portion of the pretzel and means to then move the said end into contact with the said previously formed portion to form the twisted loop formation.

15. The method of making a pretzel which comprises forming dough into a strip of desired cross-section, shaping said strip to form a loop, then shaping said strip to form a second loop adjacent thereto, passing the strip through the first mentioned loop, and then bringing said strip to said second mentioned loop.

16. The method of making a pretzel which comprises forming dough into a strip of desired cross-section, shaping said strip to form a loop, then shaping said strip to form a second loop adjacent thereto, passing the strip through the first mentioned loop, and then bringing said strip to said second mentioned loop, the shaped portions of the strip being supported while other portions are being shaped.

17. A machine of the class described comprising forming means adapted to form a strip of dough of desired cross-section, feeding means adapted to continuously supply dough to the forming means, a support positioned to receive dough from said forming means, and moving means imparting relative motion to said forming and supporting means to progressively shape the dough as it is delivered by the forming means upon the supporting means into the shape of a pretzel, and means moving the strip of dough through the plane of the support to produce a twisted center.

GEORGE H. HARTMAN.
JOHN S. BURDEN.